United States Patent [19]

Halle et al.

[11] 4,330,495
[45] May 18, 1982

[54] NOVEL METHOD OF CROSSLINKING/FOAMING OF LOW DENSITY POLYETHYLENE USING LINEAR PEROXYKETALS

[75] Inventors: Reidar Halle, Novato; Roger N. Lewis, Martinez; John R. Muenchow, Richmond, all of Calif.

[73] Assignee: U.S. Peroxygen Company, Richmond, Calif.

[21] Appl. No.: 237,200

[22] Filed: Feb. 23, 1981

[51] Int. Cl.³ .............................................. C08J 9/06
[52] U.S. Cl. ..................................... 264/54; 264/310; 264/DIG. 5; 264/DIG. 18; 521/87; 521/89; 521/90; 521/94; 521/96; 521/143
[58] Field of Search ................... 521/96, 90, 87, 143; 264/54, 310, DIG. 5, DIG. 18

[56] References Cited

U.S. PATENT DOCUMENTS

| | | | |
|---|---|---|---|
| 3,470,119 | 9/1969 | Benning et al. | 521/96 |
| 3,608,006 | 9/1971 | Hosoda et al. | 521/134 |
| 3,640,919 | 12/1972 | Michels et al. | 521/96 |
| 3,965,054 | 6/1976 | Nojiri et al. | 521/134 |
| 4,052,543 | 10/1977 | McKellin et al. | 526/48 |
| 4,130,700 | 12/1978 | Kamath | 526/216 |
| 4,276,247 | 6/1981 | Muenchow et al. | 521/143 |

FOREIGN PATENT DOCUMENTS 1047830  11/1966  United Kingdom .

*Primary Examiner*—Morton Foelak
*Attorney, Agent, or Firm*—Townsend and Townsend

[57] ABSTRACT

A novel method of making foamed, crosslinked low density polyethylene utilizing as dual crosslinking/blowing agents, organic peroxides of the formula:

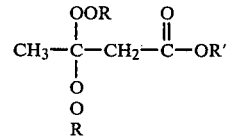

where each R is a t-alkyl group bonded through its tertiary carbon atom and having 4–8 carbon atoms; and R' is an alkyl group of 1–6 carbon atoms.

12 Claims, No Drawings

NOVEL METHOD OF CROSSLINKING/FOAMING OF LOW DENSITY POLYETHYLENE USING LINEAR PEROXYKETALS

BACKGROUND OF THE INVENTION

1. Field of the Invention

The invention relates to methods of preparing foamed, crosslinked low density polyethylene, and in particular to certain linear or acyclic peroxyketals useful as dual functioning crosslinking/blowing agents.

2. Prior Art

U.S. patent application Ser. No. 122,229 filed Feb. 19, 1980, now U.S. Pat. No. 4,276,247 discloses certain cyclic peroxyketals for dual purpose use in crosslinking and foaming of polyethylene.

U.S. Pat. Nos. 4,130,700 and 4,052,543 and British Pat. No. 1,047,830 disclose the use of linear peroxyketals, such as n-butyl 4,4-bis(t-butyl peroxy)valerate, as crosslinking agents for various polymers including ethylene-propylene rubber and low density polyethylene. Ethyl 3,3-bis(t-butyl peroxy)butyrate was used in ethylene-propylene rubber (Example 9).

U.S. Pat. Nos. 2,749,519, 2,756,035 and 2,757,427 disclose the use of such linear peroxyketals in curing unsaturated polyesters, styrene, chlorinated polyethylene and/or styrene-butadiene rubber.

DESCRIPTION OF THE INVENTION

The present invention provides a novel method of making foamed, crosslinked low density polyethylene (LDPE) by mixing low density polyethylene with about 0.10–10% by weight of a dual-functioning crosslinking/blowing agent of the formula:

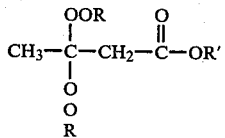

where each R is a t-alkyl group bonded through its tertiary carbon atom and having 4–8 carbon atoms; and R' is an alkyl group of 1–6 carbon atoms, and can be either straight chain or branched, and heating the mixture to a temperature sufficient to crosslink and foam the polyethylene under conditions which permit expansion of the polyethylene.

The low density polyethylene can be prepared using just the above-described peroxyketals as the crosslinking and foaming (blowing) agent or, as will be shown in the experimental work below, any of the chemical blowing agents known in the art or described in the above referenced copending patent application may also be incorporated. In the usual case the method will be practiced by placing the polyethylene mixture in a mold and heating it under pressure, the pressure thereafter being released to permit expansion of the composition into a foam structure. Typically the final expanded volume of the mixture relative to its initial volume will be about 130% or more, whereby the density of the polyethylene is reduced.

According to the method of the present invention, the peroxyketals used decompose at temperature ranges at which low density polyethylene is conveniently molded, typically in the range of 150°–250° C. This yields carbon dioxide gas and decomposition residues which are compatible with foamed, crosslinked low density polyethylene. The gas yield upon decomposition is sufficient to create a foam when the acyclic peroxyketals are utilized as blowing agents in accordance with the method of the present invention. The amount of gas evolution is generally determined by the temperature, time and amount of peroxyketal used. During the process of the present invention the peroxyketals employed also serve to cause the polyethylene to crosslink.

The polyethylene useful with the present compounds is commonly referred to as low density polyethylene. Low density polyethylene is defined as branched chain polyethylene having a density of from about 0.910 to about 0.935 grams/cc and may contain varying amounts of 1-butene, 1-hexene and propylene.

Incorporation of the crosslinking/blowing agents may be effected by a variety of techniques known in the art including dry tumbling, liquid dispersion of the organic peroxides and pelletized concentrates of the organic peroxides. Each of these techniques is described in more detail in Modern Plastics Encyclopedia 1979–1980, page 188.

Once the mixing of the polyethylene and the crosslinking/blowing agent is completed, the mixture is molded by conventional means under conditions which allow expansion of the foam, including heating to a temperature sufficient to crosslink and foam the polyethylene, usually within a preferred range of 150°–250° C. Typically, the mixture is heated to a temperature sufficient to effect crosslinking and foaming in the absence of applied pressure or substantially at atmospheric pressure in a mold having a volume greater than the initial volume of the mixture and the mixture expands to fill the mold volume. The crosslinking and foaming may occur simultaneously or sequentially. The resultant foamed or expanded polyethylene, having increased in volume, will typically have a reduction in density of at least 30 percent as compared to the starting density of the polyethylene. When a foamed article of a particular shape is desired, the step of mixing the polyethylene and the crosslinking/blowing agent may be followed by shaping the mixture into the desired form.

The expansible mixtures of the present invention may be foamed by a variety of conventional methods. For example, foamed polyethylene blocks or articles may be prepared by introducing a volume of mixture into a mold having a larger total volume and heating the mixture within the mold to at least 150° C. whereby the polyethylene is crosslinked and expands into and fills the mold. The foamed polyethylene blocks may then be set by cooling.

In another embodiment the expansible mixture may be introduced into a mold of substantially the same volume. The mixture in the mold is then heated to at least 150° C. to initiate crosslinking and foaming. As the pressure within the mold increases, the volume of the mold may be increased, as by separating the sides, thereby allowing the foam to gradually expand with the mold. Alternatively, the expansible mixture may be heated in a mold of substantially the same volume to at least 150° C. for a period of time sufficient to initiate crosslinking, followed by a release of pressure thereby allowing the polyethylene to expand.

The heating may be carried out under an initially applied pressure or the pressure may increase from initially atmospheric pressure conditions due to the $CO_2$ released during the decomposition of the crosslinking/blowing agent. In another embodiment, sheet-like polyethylene may be turned into foamed sheet continuously by heating it in a hot air oven on a wire-net conveyor of appropriate mesh size.

The amount of peroxyketal crosslinking/blowing agent used according to the present invention may vary depending on the density of the starting polyethylene, the temperature and the degree of foaming, i.e. expansion, desired, but will usually be in the range of from about 0.01–10%, more typically 0.50–5.0% by weight of the polyethylene. Similarly, as will be known and understood by those skilled in the art the process steps followed in the practice of the present invention can be varied depending on the type of polyethylene utilized, the density of foam desired, and the degree of crosslinking desired.

In a preferred embodiment the heating for purposes of simultaneously or sequentially foaming and crosslinking the polyethylene is applied during the procedure known as rotational molding. Rotational molding is a process intended primarily for the manufacture of hollow objects. In this process the solid or liquid polymer is placed in a mold; the mold is first heated and then cooled while being rotated about two perpendicular axes simultaneously. During the first portion of the heating stage when molding powdered material, a porous skin is formed on the mold surface. This gradually melts as the cycle progresses to form a homogenous layer of uniform thickness. However, when molding a liquid material, it tends to flow and coat the mold surface until the gel temperature of the resin is reached, at which time all flow ceases. The mold is then indexed into a cooling station, where forced air, water spray or a combination of both cool the mold. It is then positioned in a work zone, where the mold is opened, the finished part removed and the mold recharged for the following cycle. Centrifugal force rather than applied pressure is utilized during rotational molding. For more details as to various techniques and apparatus used in rotational molding see Kravity and Heck, "Now's The Time To Look Into Foam Rotational Molding", Plastics Technology, October 1979, p. 63–66.

The following experimental work is designed to show the satisfactory results obtained by the processes and compositions of the present invention.

EXPERIMENTAL PROCEDURES

A. Synthesis of Linear Peroxyketals

Example 1.

Synthesis of ethyl-3,3-bis(t-amylperoxy)butyrate (Peroxyketal B, Table 1)

61.6 g of 84.5% t-amylhydroperoxide (0.50 mole) was added to 30 g of ethyl acetoacetate (0.24 mole) and mixed at $-5°$ C. Then 22.2 g of 78% $H_2SO_4$ (0.18 mole) was added dropwise in 4 minutes to the mixture. The temperature was allowed to rise to $+5°$ C., and the reaction mixture was stirred for one hour at this temperature. Then the reaction mixture was transferred to a separatory funnel using cold water. After phase separation, the organic layer was washed with 200 ml of each of the following solutions: 5% $Na_2SO_4$, 4% NaOH, 1% $H_2SO_4$, 4% NaOH, 1% $H_2SO_4$, and 5% $Na_2SO_4$. Finally, the organic layer was filtered through a 50/50 by weight cake of anhydrous $Na_2SO_4/MgSO_4$ and concentrated under vacuum in a 35°–40° C. water bath to yield 37.1 g of a liquid product. Product Active Oxygen analysis: Theory, 9.99; found 9.33, 93.38% pure; 45.9% yield.

By substituting the appropriate hydroperoxide (t-butyl hydroperoxide and 1,1,3,3-tetramethylbutyl hydroperoxide) in the general synthesis procedure, the following peroxyketals were prepared:

| Code Letter, Table I | Chemical Name | % Purity | % Yield |
| --- | --- | --- | --- |
| A | ethyl-3,3-bis(t-butyl peroxy) butyrate | 99.0 | 60.9 |
| C | ethyl-3,3-bis(1,1,3,3-tetramethylbutylperoxy) butyrate | 83.2 | 67 |

B. Method for Making Foamed Crosslinked Low Density Polyethylene

The resin mixture was prepared by dry blending 2.5 phr peroxide (100% purity basis) and the additives shown in Table I together into 30 g of low density polyethylene (LDPE) powder. The additives, such as antioxidant, filler, and blowing agent were added first and mixed well for about 3 minutes. Then the peroxide was added to the mixture and mixed well for another 3 minutes. The low density polyethylene resin used was USI MN 718 Microthene powder with a density of 0.917 and a melt index of 8.5. Platen temperatures on the press were checked with a surface pyrometer. Mold time was 20 minutes at 170° C.

The resin mixture was spread evenly over the lower platen, which had been covered with aluminum foil. Another sheet of aluminum foil was placed on top of the resin mixture. The platens were then gently brought together (about 4 mm apart) with very little, if any, ram pressure applied. At the end of the molding cycle, the ram pressure indicated on the press gauge was approximately 1000 lbs. The molded specimen was then released and cooled quickly in water. Each molded specimen had the aluminum foil peeled off before any evaluations were performed.

To determine the percent weight gel, a sample was cut into pieces and placed inside a stainless steel screen pouch. These pouches were extracted in two liters of boiling xylene containing 10 g of antioxidant for 16 hours and then dried in an oven at 140° C. for 4 hours.

The percent weight was calculated by the following formula:

$$\% \text{ wt. gel} = (W_1 - (W_2 - W_3) - 0.0036/W_1) \times 100$$

where:
$W_1$ = wt. of sample, g.
$W_2$ = wt. of sample + pouch, g.
$W_3$ = wt. of sample + pouch after extraction, g.
0.0036 = blank value for resin without peroxide Densities were determined by ASTM 1622-63, "Apparent Density of Rigid Cellular Plastics".

The results are reported below in Table I. Dicumyl peroxide was used in the above experimental work for comparative purposes since it is the standard or conventional peroxide used for crosslinking low density polyethylene.

Zinc oxide is utilized as a nucleating agent which aids in obtaining a foam with a more uniform cell size and is frequently used when making foamed polyethylene. As typically done, when a nucleating agent is used it is added in an amount of about 1-5 parts by weight of the resin.

Similarly other ingredients which do not adversely affect the molding, or the crosslinking or foaming of the polyethylene and which do not impart undesirable characteristics to the foam products can be added to the mixture. Examples of such materials which may be added under suitable conditions and in suitable amounts include pigments, stabilizers, antistatic agents, ultra-violet absorbers for light stabilization, fillers, reinforcing materials, etc. The only requirements for such additives is that they be compatible with the specific composition to permit proper molding, crosslinking and foaming to obtain well formed products and molded articles having the desired properties.

TABLE I

Crosslinking/Foaming Low Density Polyethylene (LDPE)
Using 2.5 phr Peroxide at 170° C. for 20 Minutes

| | Peroxide | MW | Additives | phr | % Wt Gel | Density g/cm³ | Density lbs/ft³ | Cell Size[1] | Color[2] |
|---|---|---|---|---|---|---|---|---|---|
| 1. | Blank (w/o peroxide) | — | — | — | — | 0.83 | 51.8 | — | W |
| 2. | Dicumyl Peroxide | 270.4 | (a) — | — | 85.9 | 0.52 | 32.5 | L | W |
| | | | (b) DSTDP[3] | 0.1 | 85.0 | 0.50 | 31.2 | L | W |
| | | | (c) OBSH[4] | 0.5 | 61.4 | 0.35 | 21.9 | S | LB |
| | | | (d) ZnO | 5 | 82.4 | 0.58 | 36.2 | S | W |
| | | | (e) OBSH/ZnO | 0.5/5 | 75.6 | 0.38 | 23.7 | S | W |
| 3. | Peroxyketal A | 292.4 | (a) — | — | 82.9 | 0.53 | 33.1 | L | W |
| | | | (b) DSTDP | 0.1 | 80.6 | 0.48 | 30.0 | L | W |
| | | | (c) OBSH | 0.5 | 36.1 | 0.23 | 14.4 | S | B |
| | | | (d) ZnO | 5 | 86.9 | 0.62 | 38.7 | S | W |
| | | | (e) OBSH/ZnO | 0.5/5 | 81.8 | 0.36 | 22.5 | S | W |
| 4. | Peroxyketal B | 320.4 | (a) — | — | 78.1 | 0.37 | 23.1 | L | W |
| | | | (b) DSTDP | 0.1 | 79.8 | 0.34 | 21.2 | L | W |
| | | | (c) BHT[5] | 0.1 | 79.6 | 0.37 | 23.1 | L | W |
| | | | (d) Santonox R[6] | 0.1 | 76.8 | 0.35 | 21.9 | L | W |
| | | | (e) OBSH | 0.5 | 44.8 | 0.26 | 16.2 | S | LB |
| | | | (f) ZnO | 5 | 76.1 | 0.25 | 15.7 | S | W |
| | | | (g) OBSH/ZnO | 0.5/5 | 77.7 | 0.23 | 14.4 | S | W |
| 5. | Peroxyketal C | 404.6 | (a) — | — | 56.7 | 0.32 | 20.0 | L | W |
| | | | (b) DSTDP | 0.1 | 14.4 | 0.43 | 26.8 | L | W |
| | | | (c) Santonox R | 0.1 | 13.3 | 0.42 | 26.2 | L | LY |
| | | | (d) OBSH | 0.5 | 35.0 | 0.32 | 20.0 | S | LB |
| | | | (e) ZnO | 5 | 33.4 | 0.39 | 24.4 | S | W |
| | | | (f) OBSH/ZnO | 0.5/5 | 47.8 | 0.29 | 18.1 | S | W |

[1]L = large; S = small
[2]W = white; LY = light yellow; LB = light brown; and B = brown
[3]Distearyl thiodipropionate - an antioxidant
[4]P,P'Oxybis (benzene sulfonyl hydrazide) - a chemical blowing agent (CBA)
[5]Butylated hydroxy toluene - an antioxidant
[6]A thio alkylated phenol type antioxidant By way of summary of the results reported in Table I, it is shown that:

1. Dicumyl peroxide produces some foaming action but generally the linear peroxyketals effect a substantially greater reduction in density of the end product. This is shown in Table II below which is derived from the data of Table I and relates the percent density reductions achieved with the use of the linear peroxyketals compared to the standard dicumyl peroxide.

2. Anti-oxidants such as the esters of thiodiproprionic acid do not function as activators for the peroxyketals.

TABLE II

| | | % Density Reduction Achieved | | | |
|---|---|---|---|---|---|
| Peroxy-Ketal | Compared to: | Blank | DCP alone | DCP/ OBSH | DCP/ OBSH/ZnO |
| A | | 36.1 | 0 | 34.2 | 0 |
| B | | 55.4 | 25.8 | 26.0 | 39.2 |
| C | | 61.4 | 38.5 | 8.7 | 23.6 |

We claim:

1. A method for making foamed, crosslinked low density polyethylene comprising: mixing low density polyethylene with about 0.10-10% by weight of a crosslinking/blowing agent having the formula:

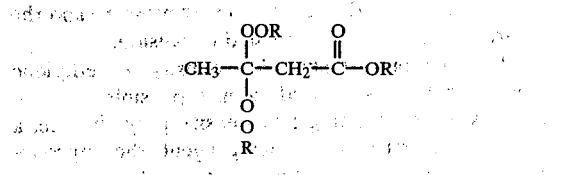

wherein each R is a t-alkyl group bonded through its tertiary carbon atom and having 4-8 carbon atoms; and R' is an alkyl group of 1-6 carbon atoms; and heating said mixture to a temperature sufficient to crosslink and foam said polyethylene in an area and under conditions which permit expansion of the polyethylene.

2. A method for making foamed, crosslinked low density polyethylene in accordance with claim 1 wherein R' is ethyl.

3. A method in accordance with claim 1 wherein each R is t-butyl.

4. A method in accordance with claim 1 wherein each R is t-amyl.

5. A method in accordance with claim 1 wherein each R is 1,1,3,3-tetramethylbutyl.

6. A method in accordance with claim 1 wherein a chemical blowing agent is also mixed with said polyethylene.

7. A method in accordance with claim 6 wherein said chemical blowing agent is P,P'Oxybis (benzene sulfonyl hydrazide).

8. A method in accordance with claim 1 wherein a nucleating agent is also mixed with said polyethylene.

9. A method in accordance with claim 8 wherein said nucleating agent is zinc oxide.

10. A method in accordance with claim 1 wherein said mixture is heated in a mold under pressure and the pressure is released to permit said expansion.

11. In a method of making low density polyethylene articles by rotationally molding an expansible polyethylene mixture comprising low density polyethylene, a crosslinking agent and a blowing agent, the improvement comprising using as both said crosslinking agent and said blowing agent an organic peroxide of the formula:

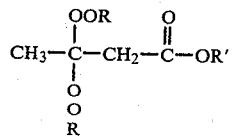

wherein each R is a t-alkyl group bonded through its tertiary carbon atom and having 4–8 carbon atoms; and R' is an alkyl group of 1–6 carbon atoms.

12. The improvement of claim 11 wherein a second chemical blowing agent is also mixed with said polyethylene.

* * * * *